United States Patent

Rantanen

[11] Patent Number: 5,918,506
[45] Date of Patent: Jul. 6, 1999

[54] TRANSFER DEVICE

[75] Inventor: Matti Rantanen, Kirkkonummi, Finland

[73] Assignee: Orion-Yhtyma Oy, Finland

[21] Appl. No.: 08/714,004

[22] Filed: Sep. 13, 1996

[30] Foreign Application Priority Data

Sep. 21, 1995 [FI] Finland .................... 954477

[51] Int. Cl.⁶ .................... F16H 25/20
[52] U.S. Cl. .................... 74/424.8 A; 108/143; 384/37
[58] Field of Search ............ 74/424.8 A; 108/143; 384/37, 42; 269/175, 177, 178

[56] References Cited

U.S. PATENT DOCUMENTS

| 291,012 | 12/1883 | Kern, Jr. et al. | 74/424.8 A X |
|---|---|---|---|
| 349,032 | 9/1886 | Ernst | 269/175 |
| 1,002,486 | 9/1911 | Bateman | 269/177 |
| 1,489,110 | 4/1924 | Billington | 269/178 |
| 4,702,621 | 10/1987 | Heinonen et al. | 384/37 |
| 4,714,354 | 12/1987 | Satomi | 384/38 |
| 5,143,454 | 9/1992 | Morita | 384/37 |
| 5,672,010 | 9/1997 | MacNicol et al. | 384/42 |

FOREIGN PATENT DOCUMENTS

| 1572986 | 9/1970 | Germany . |
|---|---|---|
| 2054559 | 5/1971 | Germany . |
| 4337615 | 11/1994 | Germany . |
| 519125 | 3/1972 | Switzerland . |
| 1492077 | 11/1977 | United Kingdom . |

*Primary Examiner*—Allan D. Herrmann
*Attorney, Agent, or Firm*—Lahive & Cockfield, LLP

[57] ABSTRACT

The invention relates to a transfer device for generating a regular, linear transfer movement especially for reading an image plate used in X-raying. The transfer device comprises a fixed housing, a rotatable threaded bar (5), a slide (6) moving linearly on the bar, slide guides (9, 10) for controlling the linear movement of the slide, and members for transforming the rotational movement of the bar into the linear movement of the slide. In accordance with the invention, these members consist of two followers (8) elastically articulated in the slide (6) and placed on opposite sides of the threaded bar (5), each of which is provided with a tongue (15) elastically stressed in the threaded groove (7) of the bar, the stressing member consisting of a pull device (19, 21) fitted between the followers and interconnecting the followers elastically in the transverse direction of the threaded bar. The pull device may consist of a magnet (19) and its counterpart (21), or optionally of a draw-spring between the followers.

4 Claims, 3 Drawing Sheets

TRANSFER DEVICE

CROSS REFERENCES TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

This invention relates to a transfer device for generating a regular, linear transfer movement, comprising a fixed housing, a rotatable bar, a slide moving linearly on the bar, guides for controlling the linear movement of the slide, and a follower articulated in the slide and equipped with a tongue, which is elastically stressed in the threaded groove of the bar for transforming the rotational movement of the bar into a linear movement of the slide.

2. Description of the Related Art Including Information Disclosed Under 37 CFR 1.97 and 1.98

The transfer device described above is suited for example for reading an image plate used in X-raying. In X-raying, the X-radiation conducted through the object and modified by absorption at the object is focused on an activated fluorescent layer in the image plate, where the information contained in the radiation will be stored. After this exposure step the information is read by a laser beam in a separate reading device and is transformed into an image, which is displayed on a computer screen or put out on film. The information is read on an image plate extractable from a cassette, the image plate being in optimally regular linear motion, and after the reading, the plate is cleared of information by means of intense light, and this operation may be performed while the plate is being returned into the cassette to await the following cycle.

FI patent specification 90471 discloses an extractor for reading an exposed image plate extracted from a cassette, in which the plate is moved by a slide gripping it, the slide being moved on a rotatable shaft by means of pulling bearings placed in an ascending angle with the shaft and a separate guide preventing rotation of the slide. Nevertheless, this extractor has involved the problem that the shaft tends to be fouled by oil leaking from the pull bearings and other impurities adhering to the oily shaft. To eliminate this problem, FI patent specification 90472 presents a solution, in which part of the pull bearings placed against the shaft have been replaced with a slide bearing which supports the slide while cleaning the shaft. Nonetheless, as a matter of time, the slide bearing will wear and there will be some play, so that stubborn dirt still gathers on the shaft, interfering with the regular linear movement of the slide and the image plate on this and deteriorating the quality of the image to be read.

FI patent application 940204 describes a further enhanced transfer device for reading an image plate used in X-raying, which corresponds to the above definition of the object of the present invention. Thus, the shaft of the transfer device described in patent application 940204 consists of a threaded bar, whose rotational movement is transformed into a linear movement of the slide which moves the image plate to be read by means of a follower, which is elastically stressed in the threaded groove of the bar. The follower is a plate-like body articulated in the slide and stressed in the bar groove under the effect of a magnet. The transfer device provided with such a follower has the advantage of a straightforward design and of the follower continuously cleaning the threaded groove in the bar, whose operation will not be basically affected by wear. In this manner, the slide will retain its linear movement and the quality of the images to be read will persist even when used over a long period of time.

Moreover, the magnetically stressed follower in FI application 940204 has the property of giving way to any irregularities or impurities in the threaded groove of the bar by yielding in the transverse direction of the bar, and as the follower moves away from the bar in the basically V-shaped groove, the linear movement of the slide is slowed down. However, the magnetic force decreases simultaneously as a result of growing distance, so that the stress exerted by the follower on the bar is relieved, and at the same time the rotational movement of the bar and accordingly the linear movement of the slide accelerate. Thus, these processes compensate each other at least partly so as to favour the continuously regular movement of the slide. If, however, there is some curvature in the threaded bar, the position and the loading force of the follower in the transfer device of FI patent application 940204 will be altered in the long term so that the rotational movement of the bar and the consequent linear movement of the slide will not remain constant over the entire length of the slide path, but gradual changes will occur. This causes a problem especially when the paths of the bar and the moving slide are long.

The object of this invention is to further enhance the transfer device for generating a regular linear movement so as to provide a device which is even less sensitive to irregularities or dirt or other impurities in the threaded groove of the bar, and which also keeps the linear movement of the slide constant regardless of any curvature in the threaded bar.

BRIEF SUMMARY OF THE INVENTION

The transfer device in accordance with the invention, which accomplishes the goals set out above, is characterised in that two followers have been pivotally mounted in the slide, the tongues of the followers being in the threaded groove of the bar on opposite sides of the bar, and in that the tongues are stressed against the bar by means of a pull device fitted between the followers to connect the followers elastically with each other in the transverse direction of the bar.

In the transfer device of the invention, a single impurity or any other occasional local disturbance causes one of the followers to yield momentarily, while the other follower retains its grip in the threaded groove of the bar unaltered. This arrangement ensures that at least one of the followers is continuously transforming the rotational movement of the threaded bar into a linear movement of the slide, regardless of the yielding movements of the other follower transversely to the bar in the V-shaped groove, which, without the invention, would slow down the linear movement of the slide. The two followers provided in accordance with the invention also compensate any occasional errors in the pitch angle of the threaded groove, i.e. deviations from the constant value, which, with one single follower as in prior art, would directly affect the linear rate of the slide. On the other hand, errors due to curvature in the threaded bar are eliminated in the device of the invention because the pull device interconnects elastically the movements of the two followers articulated in the slide. The mutual position and the mutual attractive force of the two followers will remain basically unaltered regardless of any curvature of the bar, and thus they will not affect the speed of rotation of the bar, nor will any changes occur in the linear rate of the slide. In all, the invention has achieved a straightforward and reliable transfer device especially suited for reading an image plate used in X-raying, which enables a more regular and flawless linear slide movement and higher laser-readable image quality to be achieved than the prior art devices described above.

The pull device between the followers articulated in the slide may advantageously consist of a magnet. The followers may then adhere to each other under the effect of the magnet, or they may optionally be spaced by a gap, where the magnetic force exerted in the transverse direction of the bar connects the followers to each other.

In accordance with the invention, the followers are preferably located symmetrically on opposite sides of the threaded bar, and at one end they are provided with a joint, with which the follower is pivoted in the slide, and at the other end with a magnet or its counterpart. The magnet included in one of the followers and the counterpart provided in the other follower may either one or both be equipped with an adjusting screw, allowing the mutual positions of the magnet and the counterpart to be adjusted so as to be in mutual contact or optionally at a given distance from each other. Instead of a magnet, the pull device between the followers may consist of a draw-spring.

The actuator driving the threaded bar and generating the regular rotational movement may be a stepper motor. The guides controlling the linear movement of the slide, which serve to stop the slide from rotating along with the threaded bar, may consist of two guide bars, the slide being connected to one of these by means of one or more fixed slide guides and to the other by means of one or more flexible slide guides.

BRIEF DESCRIPTION OF THE SEVERAL VIEWS OF THE DRAWING(S)

The invention will be described below in greater detail by means of an example and with reference to the accompanying drawing, in which FIG. 1 is a top view of a transfer device in accordance with the invention, FIG. 2 is a cross-section of the device along line II—II in FIG. 1, FIG. 3 shows the followers included in the device, stressed in the threaded groove of the threaded bar with a magnet, on a larger scale, and FIG. 4 shows another embodiment corresponding to FIG. 3, in which the member stressing the follower in the threaded bar is a draw-spring.

DETAILED DESCRIPTION OF THE INVENTION

Figure 1:
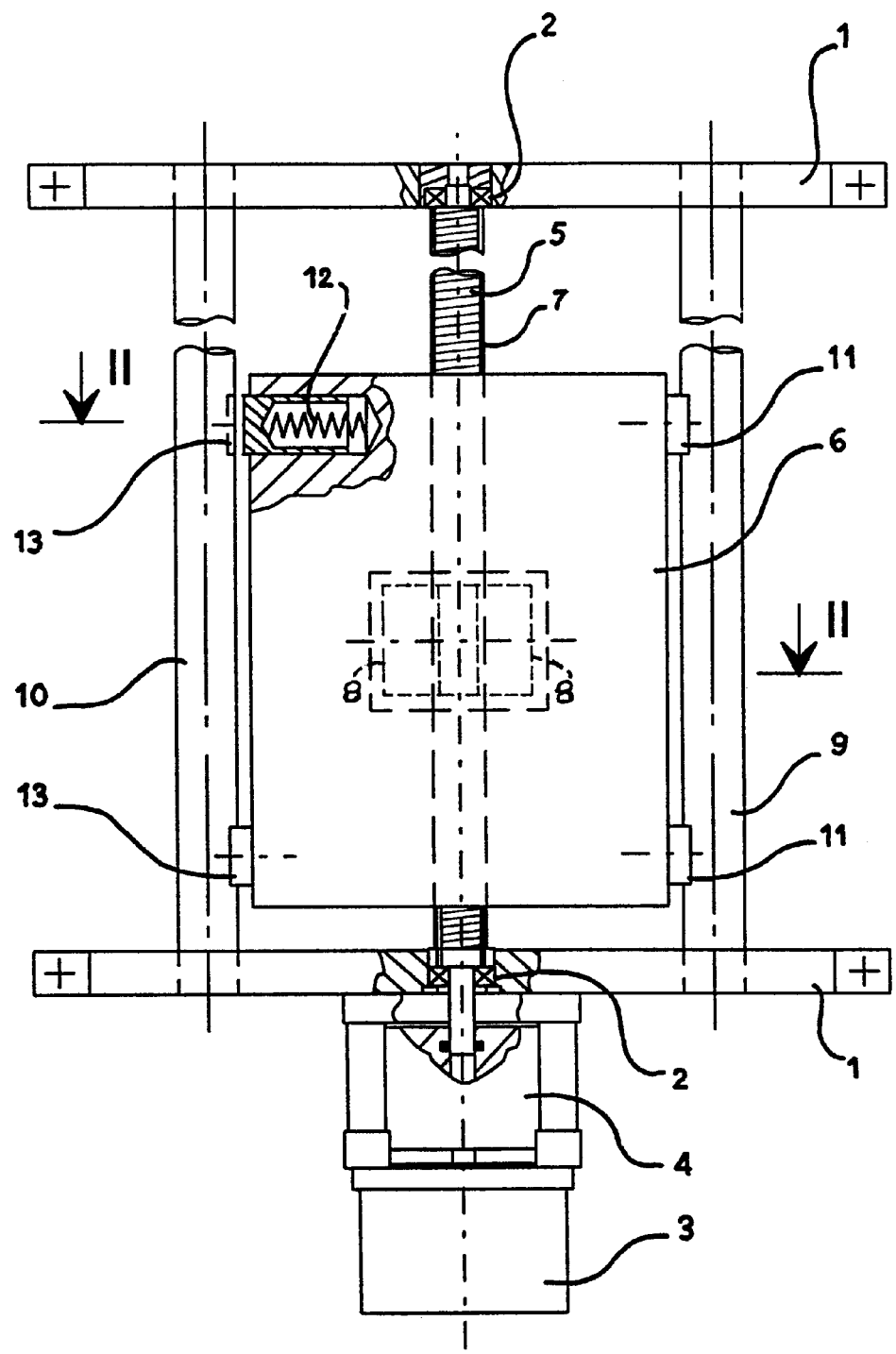
Figure 2:
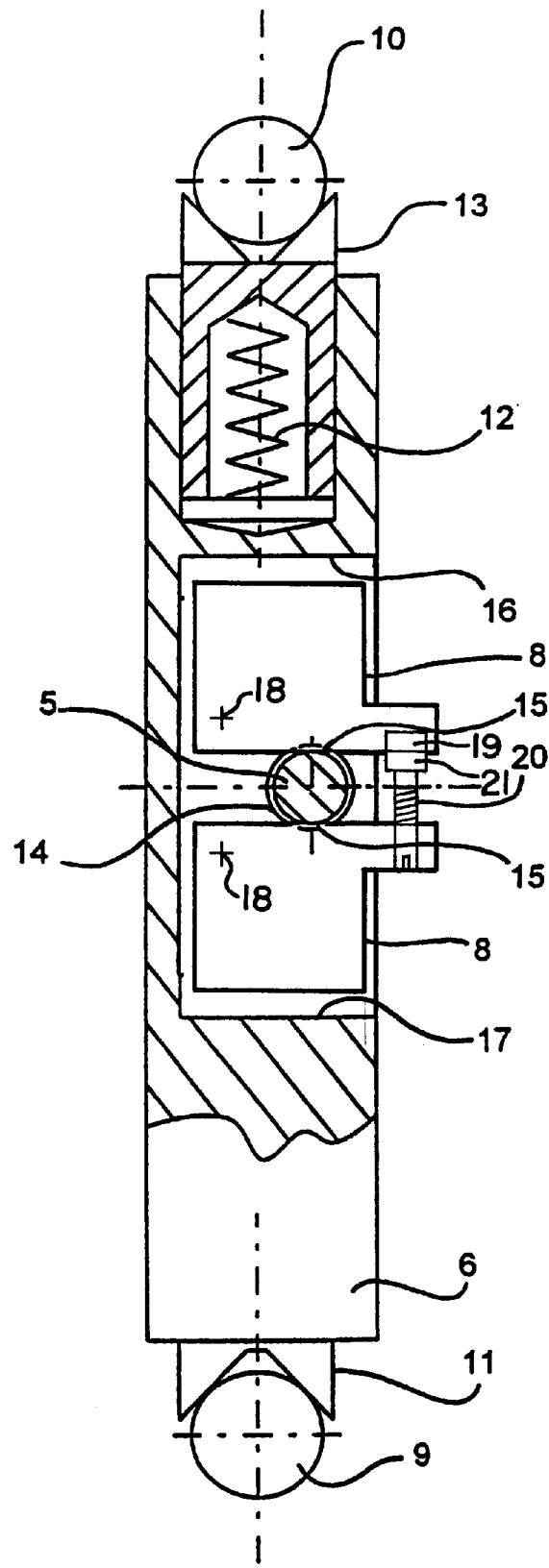

FIGS. 1 and 2 show the transfer device generating a regular linear movement in accordance with the invention, which is especially intended for a laser beam scanner used to read the image plate in panoramic cephalodigital X-raying. The transfer device comprises a fixed housing 1, a threaded bar 5, articulated in the housing with grooved ball bearings 2 and which can be brought into regular rotation by means of stepper motor 3 over switch 4, and a slide 6, brought into motion on the threaded bar by transforming the rotation of the bar into a regular linear movement of the slide. The slide 6 is fitted appropriately to grip the image plate in the cassette e.g. by means of a magnet and to guide it past the laser read head and the clearing light source (not represented) during the reciprocating linear transfer movement of the plate. The members transforming the rotational movement of the bar into the linear movement of the slide consist of followers 8 symmetrically mounted on opposite sides of the threaded bar 5 and stressed in the threaded groove 7 of the bar, shown in FIG. 2. The transfer device additionally comprises guide bars 9, 10 parallel to the threaded bar 5 and mounted on opposite sides of this, which guide the linear movement of the slide 6 by stopping it from rotating along with the threaded bar 5. The slide 6 is connected to one of the guide bars 9 by means of two fixed slide guides 11 and to the other guide bar 10 by means of two flexible slide guides 13 equipped with a spring 12.

Figure 3:
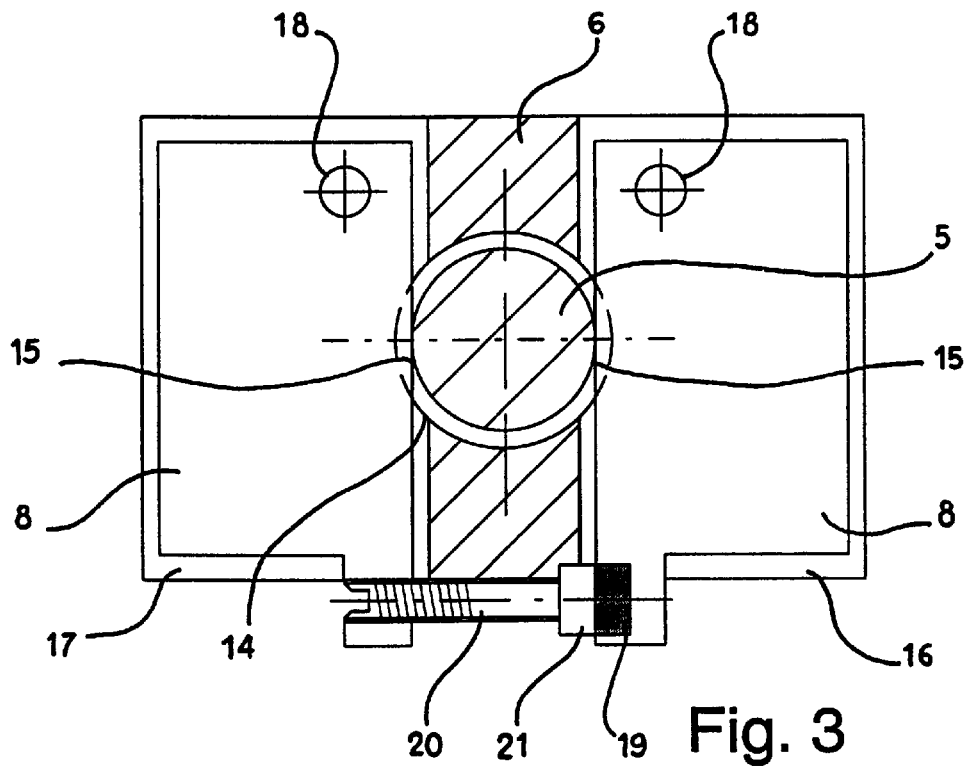

FIGS. 2 and 3 are referred to regarding the structure and the operation of the followers 8 transforming the rotational movement of the threaded bar 5 into the linear movement of the slide 6. The threaded bar 5 is passed through the slide 6 in bore 14 such that the bar and the slide are in mutual contact only through the tongues 15 of followers 8. Followers 8 are plate-like bodies placed symmetrically on opposite sides of the threaded bar 5 and fitted in recesses 16, 17 in slide 6, in which their ends are pivotally mounted in the slide by means of joints 18. The opposite sides of the plate-like followers 8 act as tongues 15 in the threaded groove 7 of the threaded bar 5. At their opposite ends relative to the joints 18 the followers 8 are elastically interconnected with a pull device 20, which consists of a magnet 19 included in one of the followers, and a magnetic counterpart 21, equipped with an adjusting screw, included in the other follower. Thus followers 8 are allowed to rotate elastically relative to the joints 18 regardless of any curvature in the threaded bar 5 or irregularities or dirt or impurities in the threaded groove 7, while the magnetic force exerted between the followers keeps the followers continuously stressed in the threaded groove 7 of the bar. In FIG. 3 the counterpart 21 touches magnet 19, however, in accordance with the invention, these members may be discrete, and in that case the magnetic force exerted between them will connect them to each other.

Figure 4:
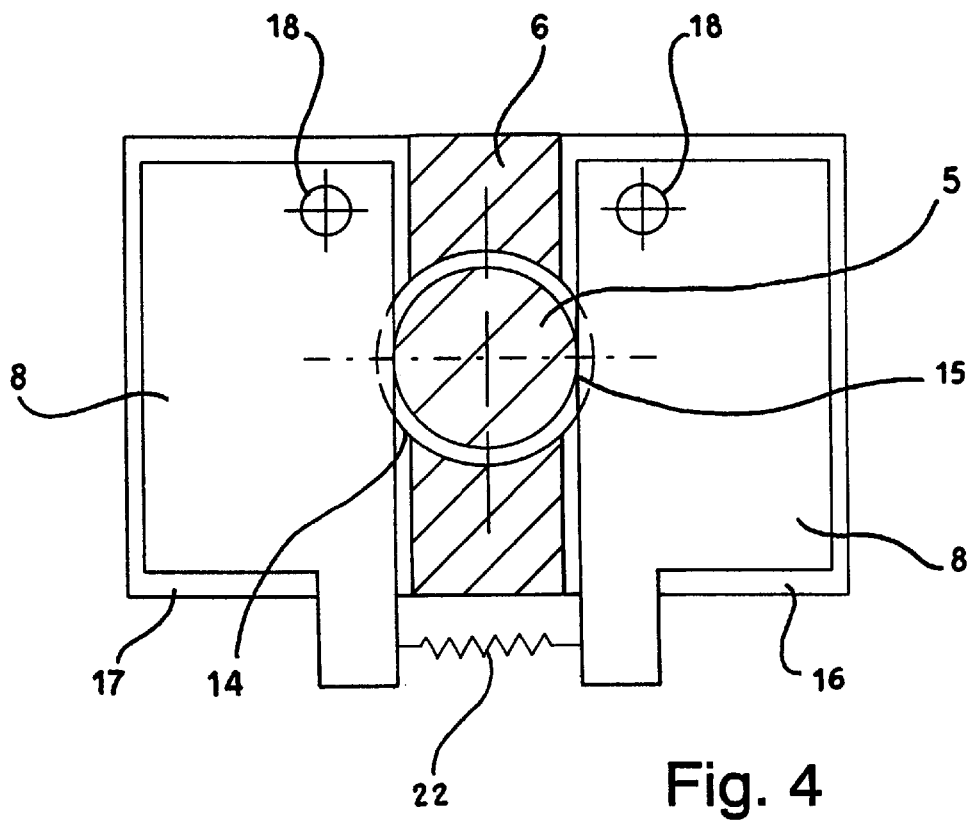

In the embodiment of the invention shown in FIG. 4, the magnet and its counterpart acting as a pull device between the followers 8, shown in FIG. 3, have been replaced with draw-spring 22. As followers 8 in FIG. 3 are rotating away from each other, their mutual magnetic force decreases, whereas the stressing force of the draw-spring increases in the analogous situation in FIG. 4. Otherwise there is no substantial functional difference between these two embodiments.

It is obvious to a person skilled in the art that the embodiments of the invention are not restricted to the embodiment presented as an example above, but may vary within the scope of the accompanying claims. Thus, though it is described as a part of a device for reading the image plate in X-raying, the transfer device is applicable also for other purposes of use requiring absolutely regular linear movement.

I claim:

1. A transfer device for generating a regular, linear transfer movement, comprising a fixed housing (1), a rotatable threaded bar (5), a slide (6) moving linearly on the bar, guides (9, 10) for controlling the linear movement of the slide, and a follower (8) articulated in the slide and equipped with a tongue (15) elastically stressed in the threaded groove (7) of the bar for transforming the rotational movement of the bar into a linear movement of the slide, characterised in that the slide (6) is provided with two pivotally mounted followers (8), whose tongues (15) are in the threaded groove (7) of the bar (5) on opposite sides of the bar, and in that the tongues are stressed against the bar by means of a pull device (19, 21, 22) fitted between the followers and connecting the followers elastically to each other in the transverse direction of the bar, the pull device comprising a magnet (19) in order to generate attractive force between the followers (8).

2. A transfer device as claimed in claim 1, characterised in that the followers (8) are symmetrically located on opposite sides of the threaded bar (5), comprising at their one end a joint (18), with which the follower is pivoted in the slide, and at their other end a magnet (19) or its counterpart (21).

3. A transfer device as claimed in claim 2, characterised in that the pull device consists of a magnet (19) included in one of the followers (8) and a counterpart (21) included in the other follower (8), at least one of these being equipped with an adjusting screw (20) for adjusting its position.

4. A transfer device as claimed in claim 2, characterised in that the magnet (19) and its counterpart (21) adhere to each other.

* * * * *